United States Patent [19]
Taft et al.

[11] 3,861,541

[45] Jan. 21, 1975

[54] INTERMODAL UNITIZED CARGO CONTROL SYSTEM

[76] Inventors: George H. Taft, 3623 S. Lee, Spokane, Wash. 99203; Robert L. Yelland, Box 431, Renton, Wash. 98055

[22] Filed: Feb. 7, 1972

[21] Appl. No.: 203,000

Related U.S. Application Data

[62] Division of Ser. No. 796,052, Feb. 3, 1969, abandoned.

[52] U.S. Cl. ........... 214/38 C, 105/366 B, 214/516, 214/518, 244/118 R, 244/137 R, 248/119 R, 296/35 A
[51] Int. Cl. .......................................... B64d 9/00
[58] Field of Search .......... 214/38 C, 515, 516, 518; 244/118 R, 137 R

[56] References Cited
UNITED STATES PATENTS

| | | | |
|---|---|---|---|
| 2,030,862 | 2/1936 | Fitch | 296/35 A X |
| 3,522,919 | 8/1970 | Bader | 244/118 R X |
| 3,612,316 | 10/1971 | Baldwin et al. | 244/137 R |

*Primary Examiner*—Robert G. Sheridan

[57] ABSTRACT

Airborne unit load devices (cargo containers, pallets, bins, vans and boxes, etc.) presented for loading at the aircraft cargo opening are translated into the aircraft and positioned for final placement therein by a set of retractable transverse mechanisms. The unit load device is then finally placed and lowered by means of a traveling carriage equipped with low-profile roller supported fingers. Serrated land and groove structure on the under surface of the unit load device interengages with a complemental floor structure as the unit load device is lowered into place. This prevents inadvertent lateral, longitudinal and vertical shifting of the unitized load caused by intransit stress or impact.

Unloading from the aircraft is accomplished by reversing the loading process. Unit load devices leaving the aircraft are placed upon a ground handling attachment pallet for immediate or later transfer to and between truck, rail car and freight terminal. Upper surface of the ground handling attachment pallet is structured to interfit with the under surface of the unit load device to effect a positive cooperative engagement. The lower surface of the ground handling attachment pallet is structured to interfit with mating structure on the supporting surface of truck or rail car, thus locking together the cargo load, unit load device, ground handling attachment pallet and the vehicle, which prevents inadvertent shifting of the load caused by intransit stress or impact.

Forklift tine pockets around the periphery of the ground handling attachment pallet facilitate its lift and placement by conventional load handling machinery. The interfitting groove structure on the vehicle floor supplies additional structural strength when securely installed or when integrally incorporated during vehicle construction. While in restraint position all mating structures complement each other by acting as a single laminated member stronger in bending than the sum of the separate members individually. Thus, the resultant strength of the supporting floor structure tends to increase as a function of the practical weight of the unit load placed upon it.

5 Claims, 38 Drawing Figures

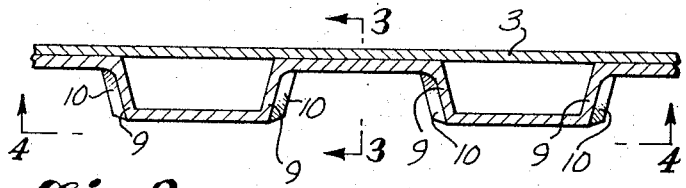
Fig. 2.
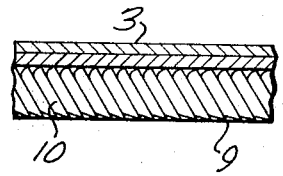
Fig. 3.
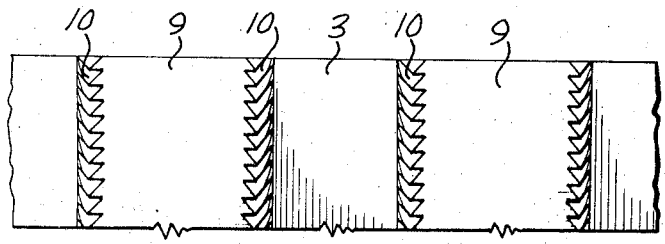
Fig. 4.
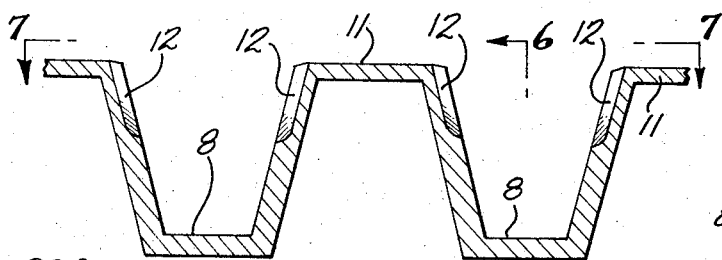
Fig. 5.
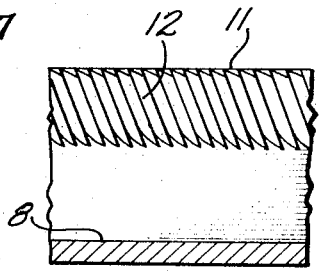
Fig. 6.
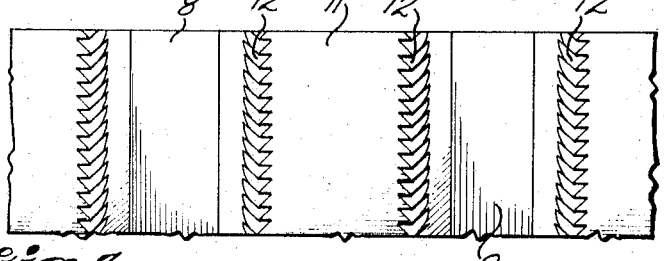
Fig. 7.
Fig. 8.
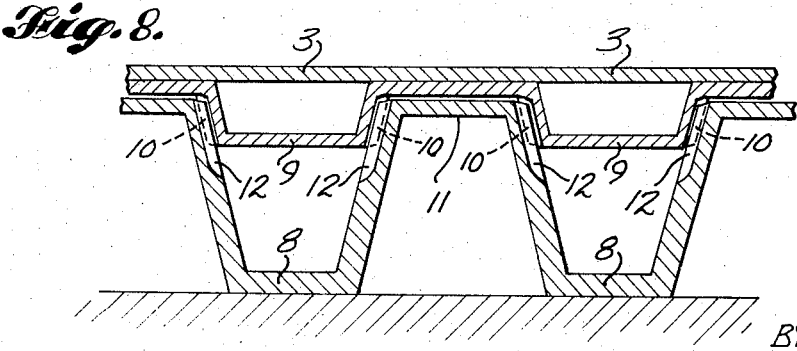
INVENTORS:
GEORGE H. TAFT
ROBERT L. YELLAND
BY Robert W. Beach
ATTORNEY

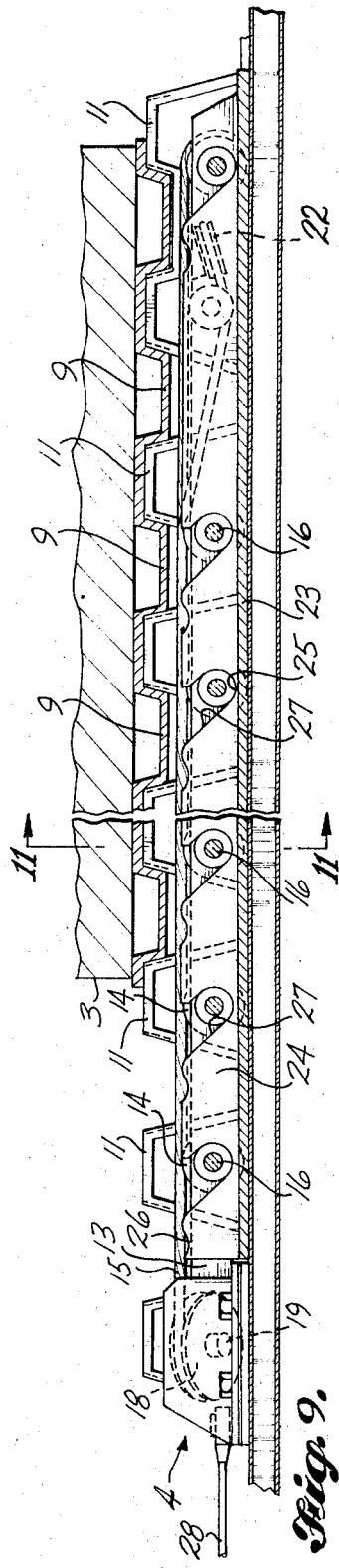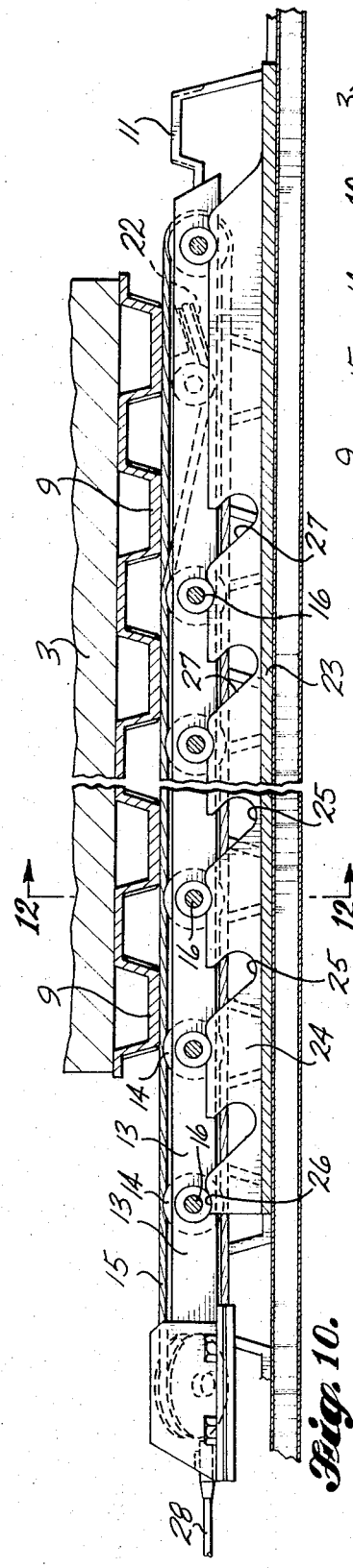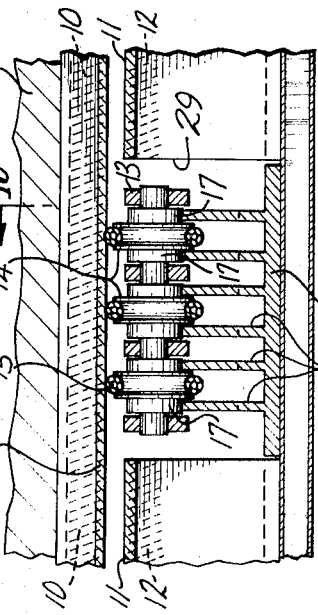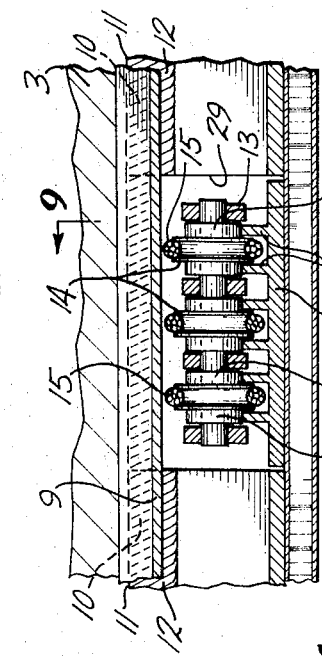

INVENTORS:
GEORGE H. TAFT
ROBERT L. YELLAND
BY Robert W. Beach
ATTORNEY

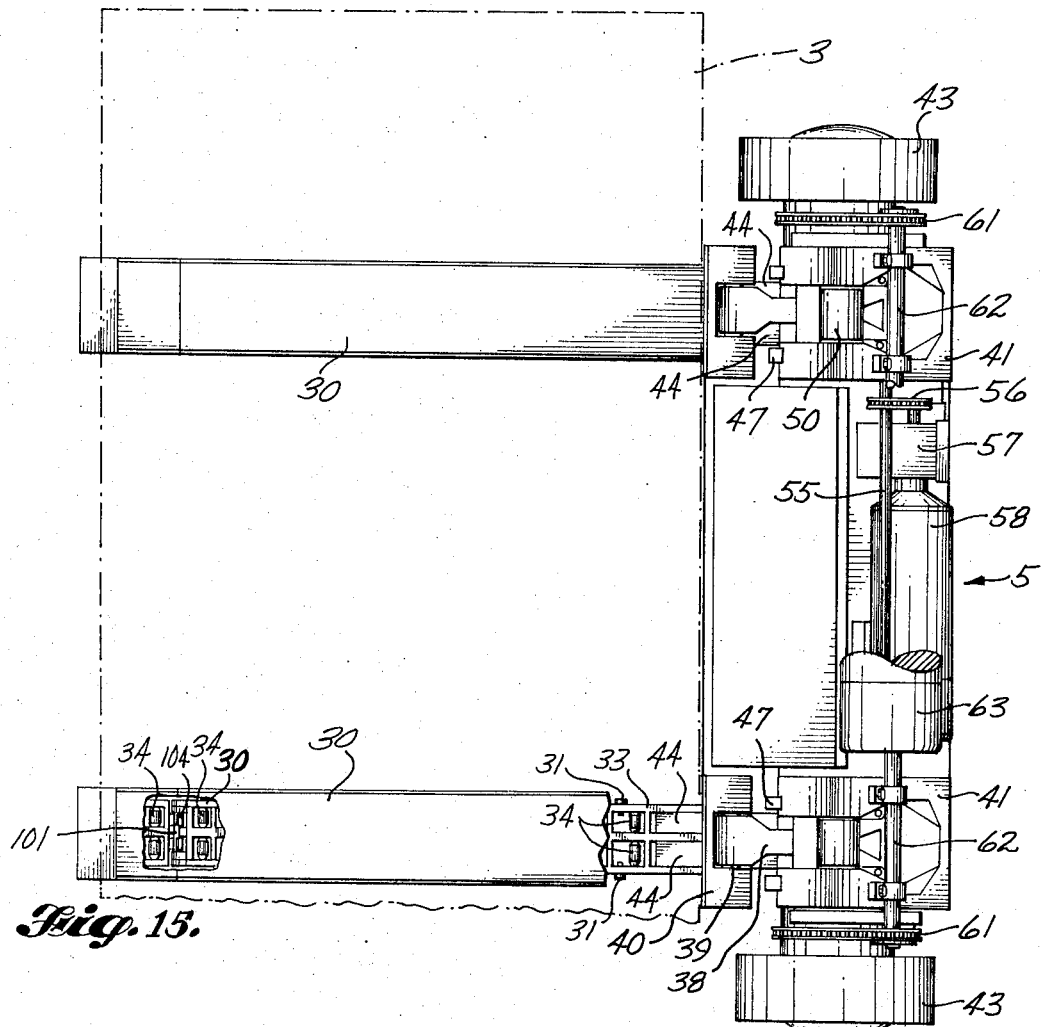
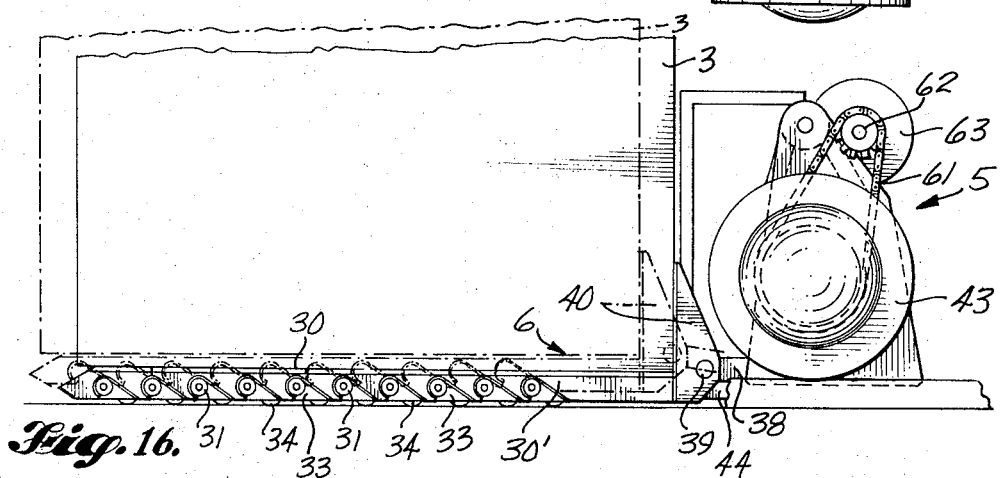

INVENTORS:
GEORGE H. TAFT
ROBERT L. YELLAND
BY Robert W. Beach
ATTORNEY

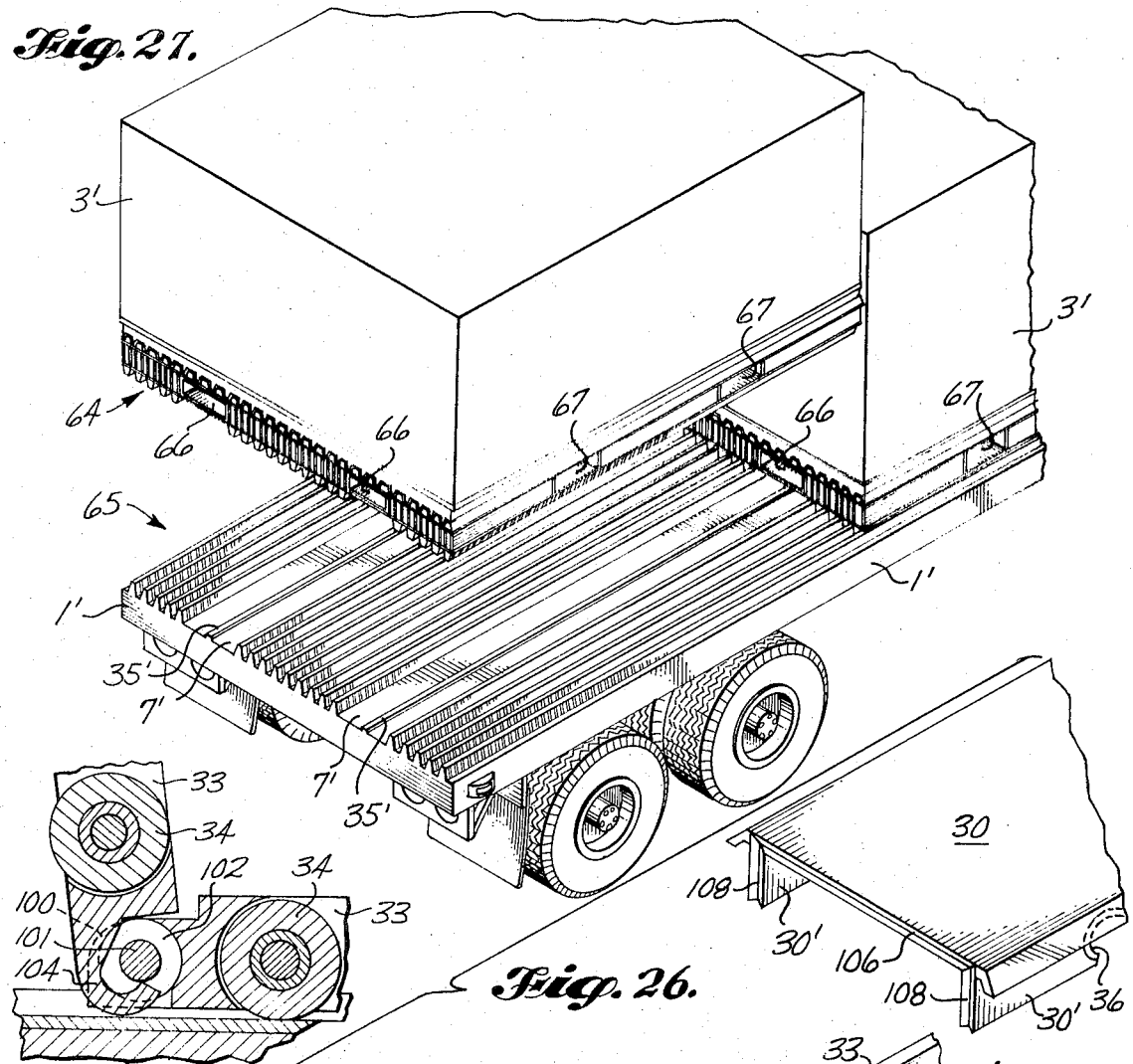
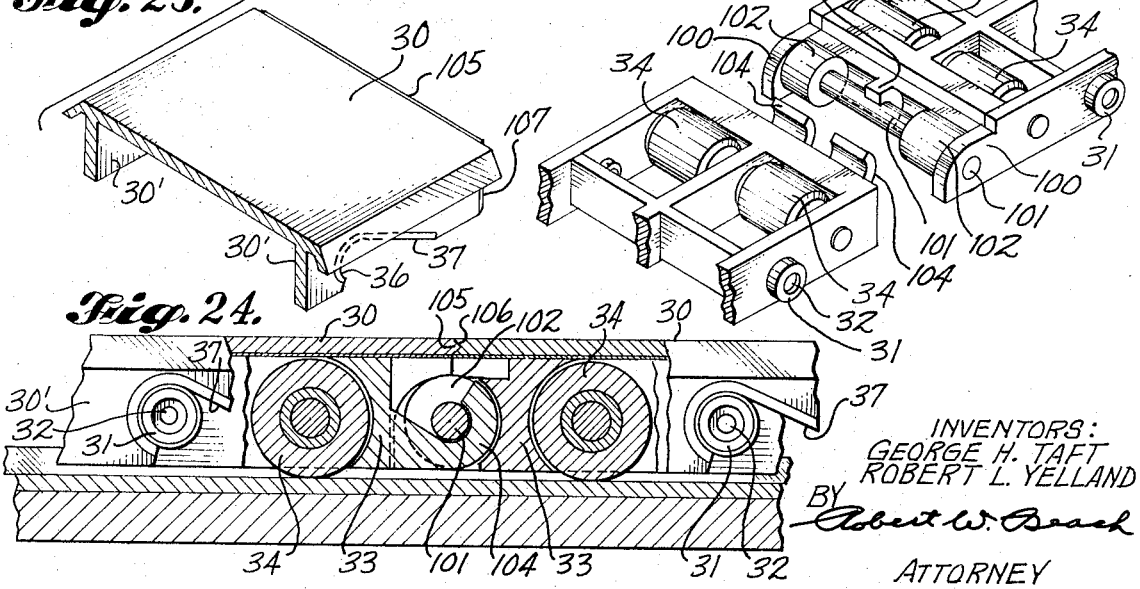

PATENTED JAN 21 1975 3,861,541
SHEET 10 OF 12
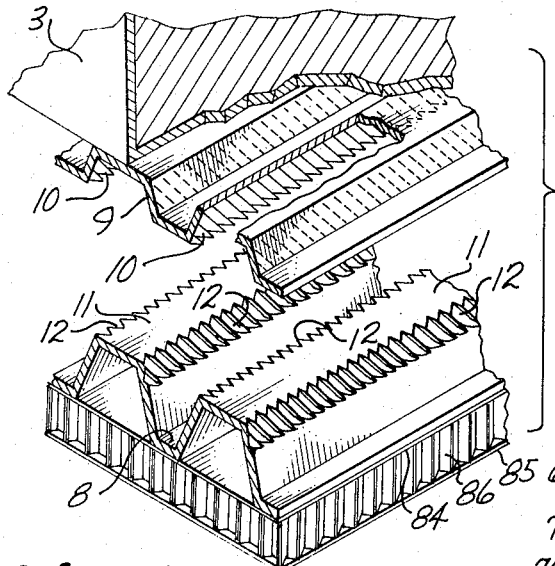
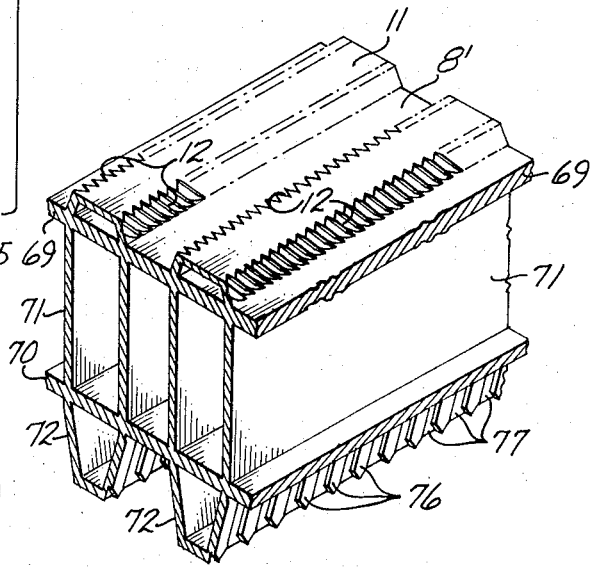
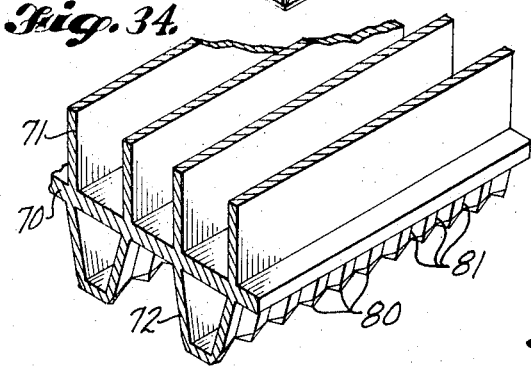
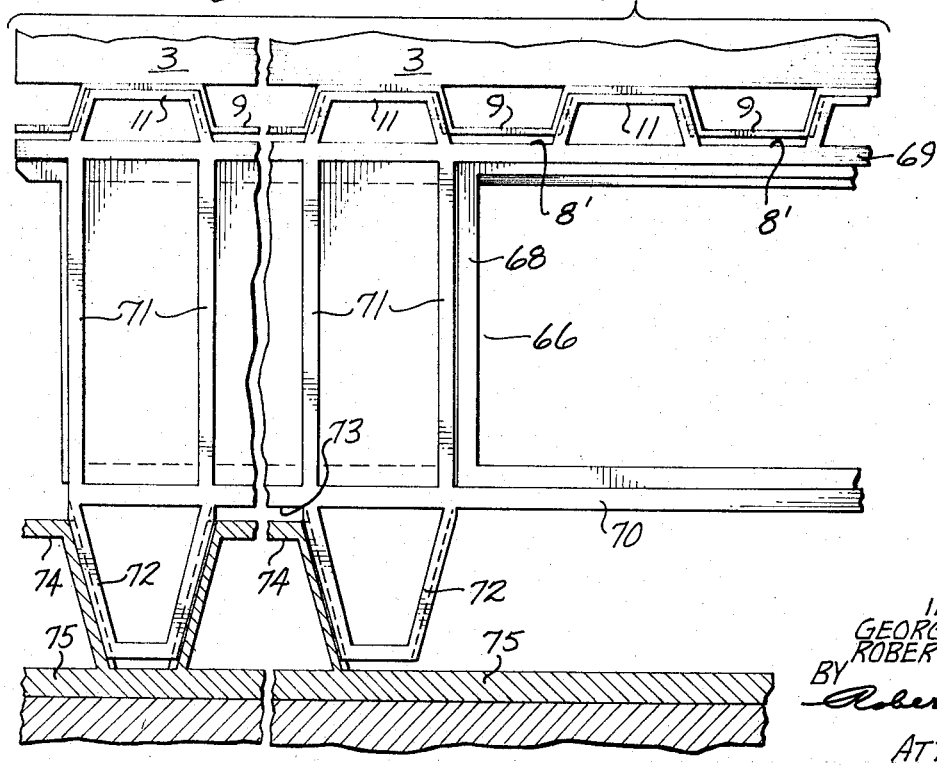
INVENTORS:
GEORGE H. TAFT
ROBERT L. YELLAND
BY Robert W. Beach
ATTORNEY

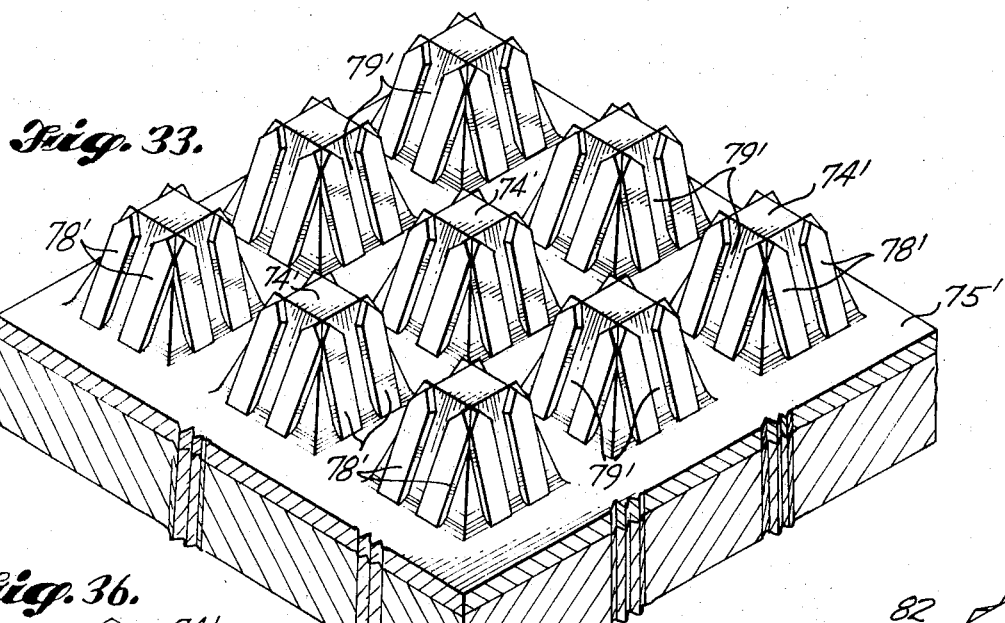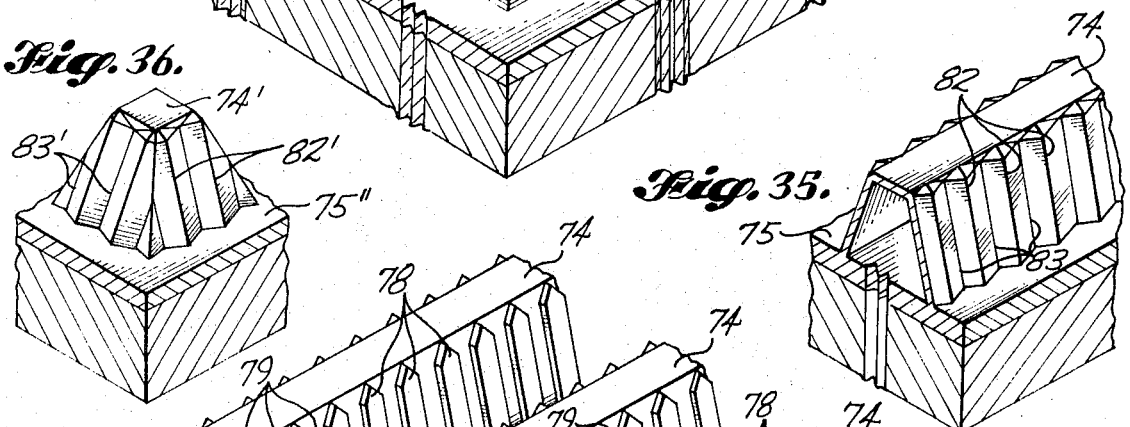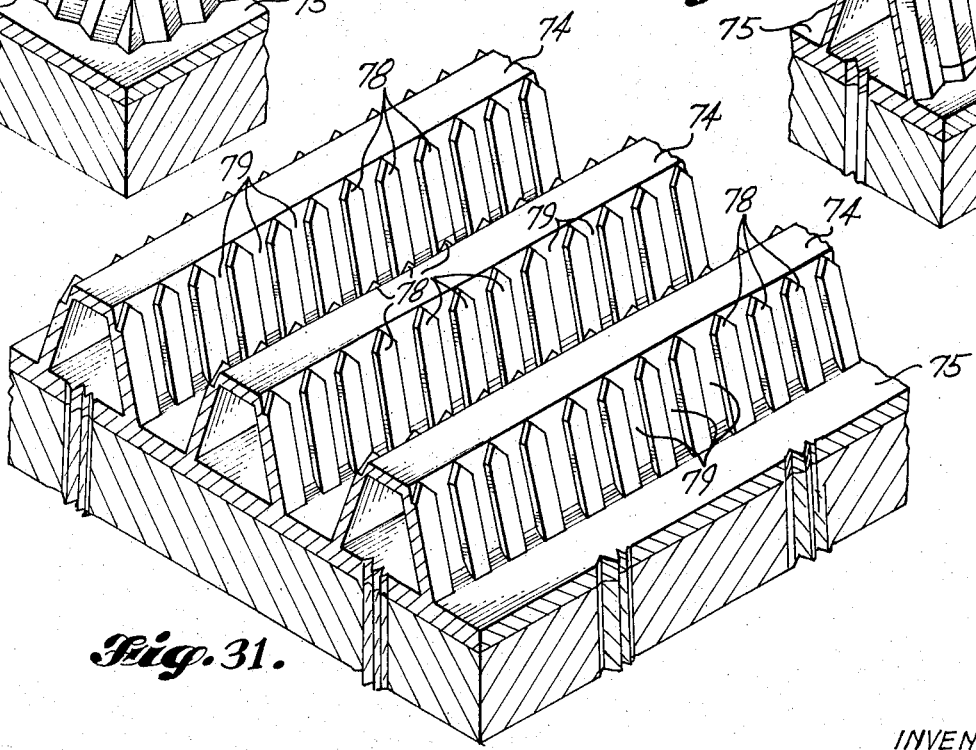

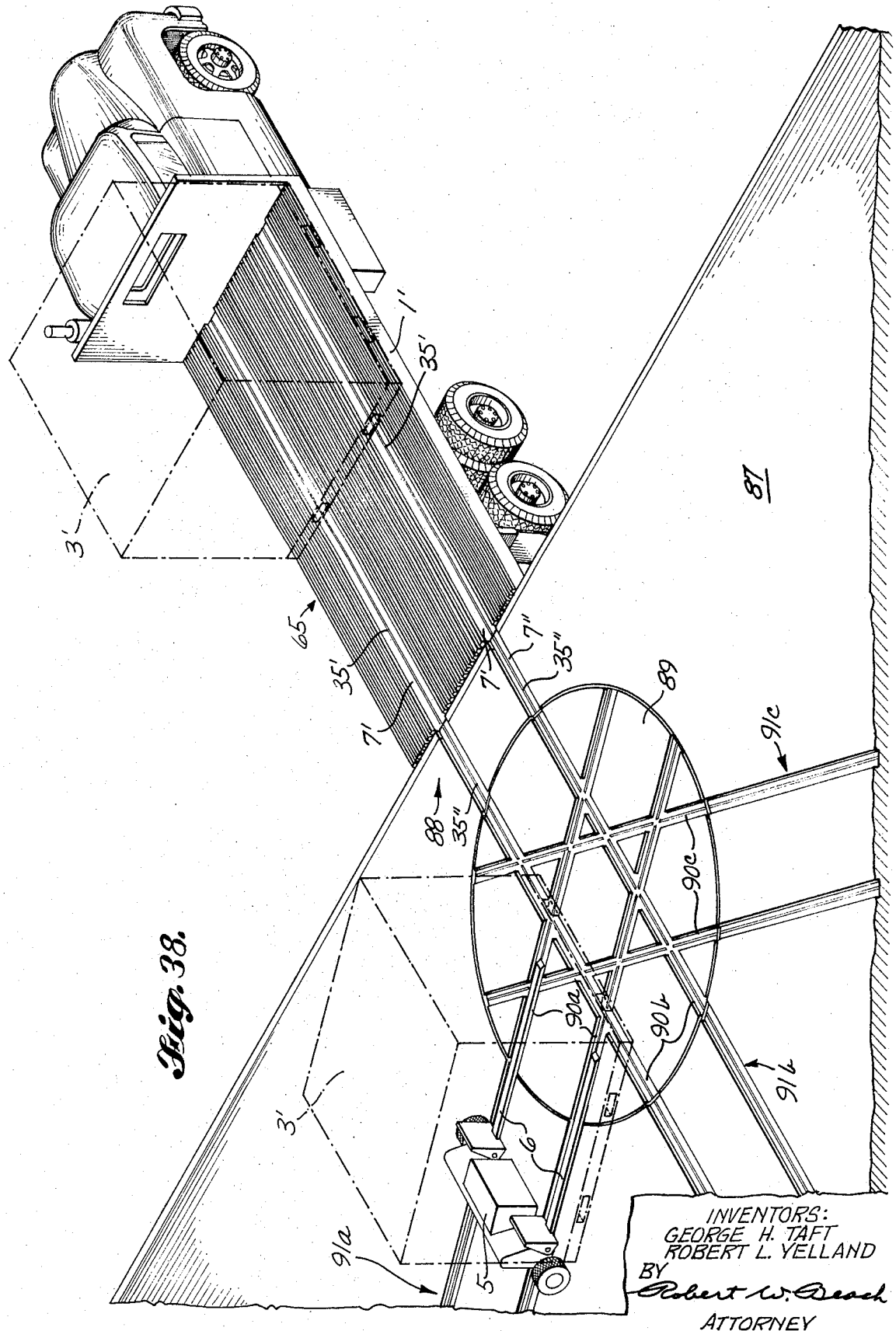

INTERMODAL UNITIZED CARGO CONTROL SYSTEM

RELATED APPLICATION

This application is a division of application Ser. No. 796,052, filed Feb. 3, 1969, now abandoned, applicants Robert L. Yelland and George H. Taft, entitled, "Cargo Container Bottom Anchoring Structure," application concerns design and certain applications of land and groove structures with additional restraint-contributing serrations incorporated thereon in a cargo container anchoring application which are useful in the integrated multimode cargo restraint, handling and control system illustrated and described herein.

BACKGROUND OF INVENTION

The growth in the use of unit load devices (cargo containers, pallets, bins, vans and boxes, etc.) by all modes of freight transportation, air and surface, has led to an increasing need for a universal loading, positioning and intransit restraint system designed to accommodate these unit load devices.

Because government air regulations are concerned with safety under all flying conditions, airworthiness restraint regulations apply equally to the cargo handling and restraint systems installed in the aircraft as well as to the cargo unit load devices being transported. Such airborne unit load devices are costly because of their lightness, strength and certificated airworthiness. Therefore, they are presently restricted from freely entering surface distribution systems because of possible damage incurred thereby and concurrent loss of airworthiness status. Freight charges, also, could probably be modified if the unit load device could be exchanged readily between all modes of transportation without rehandling individual cargo pieces when shipments pass between air and surface modes. Too, surface mode restraint requirements are primarily in lateral and longitudinal planes while air transportation requires vertical restraint, also.

The net result of these considerable differences in design criteria, handling methods and regulatory requirements between modes has been to severely limit the rapid, efficient, high-volume interchange of unit load devices between air and surface freight vehicles. Prior to this time, no intermodal handling and restraint system is believed to have been offered to industry which solves all of the functional incompatibilities enumerated.

There have been several previous inventions (such as set forth in U.S. Pat. Nos. 1,107,477; 2,030,862; 2,764,105; 2,837,038; 2,975,730; 3,093,092; 3,204,581; 3,294,034) which severally and collectively incorporate:

1. Bevels or angled structures requiring drive pins, rivets or weldments.
2. Fixed or adjustable load step or load restraint attachments mounted on the bed, sides or overhead of rail cars or trucks.
3. Various pallets, airborne shapes, "igloo hut" forms and mechanical latching mechanisms which can be actuated only after the load is exactly positioned.

None of these, singly or together, appear to offer the intermodality of the lands, grooves and serrated teeth structures which provide multi-axes intransit restraint applicable to the whole under surface of light but strong unit load devices; the complementary structures on aircraft and ground wheeled vehicle floors; and the complementary specialized mechanisms which provide ready handling and control of containered loads between these various modes.

SUMMARY OF THE INVENTION

An entirely new method for stronger, lighter, simpler load restraint while unitized or containered cargo is in-transit between shipper and consignee is here presented. A handling solution for growing problems which inhibit rapid, economical exchange of unitized cargo from one transport mode to another, particularly between air and truck, is also an integral part of this system. Another significant feature of this invention is the augmentation of the inherent supporting strength of the load carrying bed of the aircraft or surface vehicle by reason of segmented teeth interfitting over the whole mating surfaces of a containered load and its supporting structure.

The expanding air freight and air cargo industry has to function under far more operational limitations, precautions and guarantees then do surface modes. Take-off and landing inertial forces, stormy weather and other inflight gust encounters, and possible emergency mechanical situations at any time dictate design criteria for restraint of airborne payloads be more than sufficient to prevent catastrophic structural damage by loads coming loose or by reason of excessive inflight deflection and loads impinging on the aircraft structure. All airborne cargo systems and containers or other unit load devices must initially pass and continue to maintain a certificated airworthiness status supervised and regulated by the U.S. Federal Aviation Administration. Damage to these expensive airborne unit load devices, although apparently nominal, usually destroys their utility by voiding the airworthy status, without which they are unusable. Therefore, air freight operators, under no illusions as to the abuse usually given freight and cargo during surface transport distribution, have been unable to permit universal release of these unitizing devices from their immediate jurisdiction, and F.A.A. regulations have strongly augmented this air-surface barrier. The only real solution to date, therefore, has been a prohibitively expensive rehandling of the container's contents at the air cargo terminal surface transport demarcation line, which could happen several times for each shipment.

Tare weight, ever an expensive problem for vehicles, is a major concern in airborne payload systems, as is utilizing maximum cargo compartment cube by means of dimensioned, carefully loaded pallets or close-tolerance containers. The handling mechanisms of this system are designed to minimize the space and weight consumed during load handling, and during intransit operation. Most, or all, of the operational feasibility requirements have been provided for in the system approach resulting from this invention. Additional applications for the low-profile handling mechanisms incorporated in this system might include warehouses, container terminals, loading docks, access and communication tunnels, long narrow cargo compartments, etc. These mechanisms, by their very design, lend themselves to automation or remote control regulation without reducing their versatility.

The ground handling attachment pallet which is affixed to and accompanies the airworthy container throughout its surface transit cycle, lends itself in a most versatile manner to an infinite variety of conventional handling and service situations without susceptibility to frequent damage or requirement for costly repair. Also important, it supplies the necessary, heavier undersupport to the light airborne container or unit load device enabling it to withstand surface intransit shocks which cause much hidden damage to the cargo and container alike.

The application of angular, segmented teeth, distributed symmetrically along the sides of otherwise conventional land and groove channel structures, create an augmentation of normal truss-like load supporting capacity which, by binding the shoulders or projections of the teeth in a plane at right angles to the linear axis of flex, lock the intermating land and groove structures more closely together as the imposed load increases.

DRAWINGS OF PREFERRED EMBODIMENTS

The preferred embodiments of this intermodal cargo handling and restraint system to be incorporated in an aircraft, on a highway vehicle, railroad car and in freight terminals is illustrated in the following drawings wherein:

FIG. 2 is a detail vertical section of the longitudinal lands with serrations or teeth on the underside of the unit load device.

FIG. 3 is a section taken along line 3 — 3 of FIG. 2 showing raked teeth on the sides of the lands.

FIG. 4 is a bottom view of the lands and teeth taken along line 4 — 4 of FIG. 2.

FIG. 5 is a detailed vertical section of the longitudinal lands with teeth on the aircraft floor.

FIG. 6 is a section taken along line 6 — 6 of FIG. 5 showing the complemental raked teeth on the sides of the floor lands.

FIG. 7 is a top view of these complemental floor lands and teeth taken along line 7 — 7 of FIG. 5.

FIG. 8 is a detail vertical section of the longitudinal lands on the under surface of the unit load device shown in FIG. 2 interfitted with the longitudinal floor lands shown in FIG. 5.

FIG. 9 is a side view of the transverse mechanism shown in FIG. 1 in the retracted position and a cross section of the aircraft floor with the unit load device in the inflight restraint position.

FIG. 10 is a side views of the transverse mechanism shown in FIGS. 1 and 9 in the raised position to permit lateral movement of the unit load device above the floor lands.

FIG. 11 is a vertical section through the transverse mechanism in the retracted position along line 11 — 11 shown in FIG. 9.

FIG. 12 is a vertical section through the transverse mechanism in the raised position supporting the unit load device taken as indicated by section 12 — 12 of FIG. 10.

FIG. 15 is a top view of the unit load device carriage shown in FIG. 1.

FIG. 16 is a side elevation of the unit load device carriage showing the load in lowered position (solid line) and in the raised position (broken line).

FIG. 24 is a side view of the carriage finger connected with a finger extension and with a section cut away to show the mating of the upper and the lower assemblies of each.

FIG. 25 is a cross section of the supporting roller frame with the roller frame extension being connected.

FIG. 26 is an exploded view of the components of the carriage finger and the carriage finger extension.

FIG. 27 is a top perspective view of unit load devices interfitted with ground handling attachment pallets shown in loading sequence and illustrating the complementary mating structure of the attachment pallet under surface and the the truck support bed.

FIG. 30 is a top perspective of a section of the ground handling attachment pallet shown in FIGS. 27, 28 and 29 enlarged to show in detail the lands and teeth on the upper and the under surfaces.

FIG. 31 is a top perspective of a portion of the truck load support surface showing in detail the lands, grooves and teeth designed to interfit with the under surface of the ground handling attachment pallet shown in FIG. 27.

FIG. 32 is a vertical section of a portion of the ground handling attachment pallet shown in FIGS. 27, 28 and 29, showing the unit load device lands interfitted with the upper lands of the attachment pallet and the under surface lands of the attachment pallet interfitted with the lands of the truck bed structure shown in FIG. 27, or the flat car shown in FIG. 28.

FIG. 33 is a top perspective of an alternative truck or rail car load support surface showing in detail the design and placement of the castelated knob structure shown in FIG. 28.

FIG. 34 is a top perspective of a portion of the ground handling attachment pallet shown in FIG. 30 illustrating optional alternate serrated teeth structure on its under surface.

FIG. 35 is a top perspective of a portion of the vehicle load support surface shown in FIG. 31 but with optional alternate serrated teeth.

FIG. 36 is a top perspective of a portion of the vehicle support bed shown in FIG. 33 but with optional alternate serrated teeth.

FIG. 37 is a detailed top perspective exploded view of a portion of the unit load device under surface and a mating section of the aircraft floor lands as shown in FIG. 1 through 6.

FIG. 38 is a top perspective of portions of the preferred embodiment utilized on a truck dock of a cargo container terminal designed to service over-the-road vehicles and to handle unit load devices and which incorporates major features of the present invention, including carriage, special track and cooperating low-profile turntable.

INTRODUCTION OF THE PREFERRED EMBODIMENTS

The description and illustrations of the preferred embodiments are directed to the presentation of an intermodal, unitized cargo handling and restraint system applicable to air, truck and rail transportation. This invention incorporates interfitting mating surfaces that also act as structural support members for pallets and containers, as well as for aircraft decks, truck beds and rail car floors and the mechanisms and connective mating structures which enable this intermodal handling and restraint system to economically function; also, the interlocking engagement between the mating surfaces of the load and the supporting surface of a vehicle forms a truss. The allowable load on such a truss tends to increase as the imposed load increases because the interfitting structure locks more firmly together, thereby increasing its resistance to bending.

PREFERRED EMBODIMENTS

Aircraft Loading Application

Figure 1:
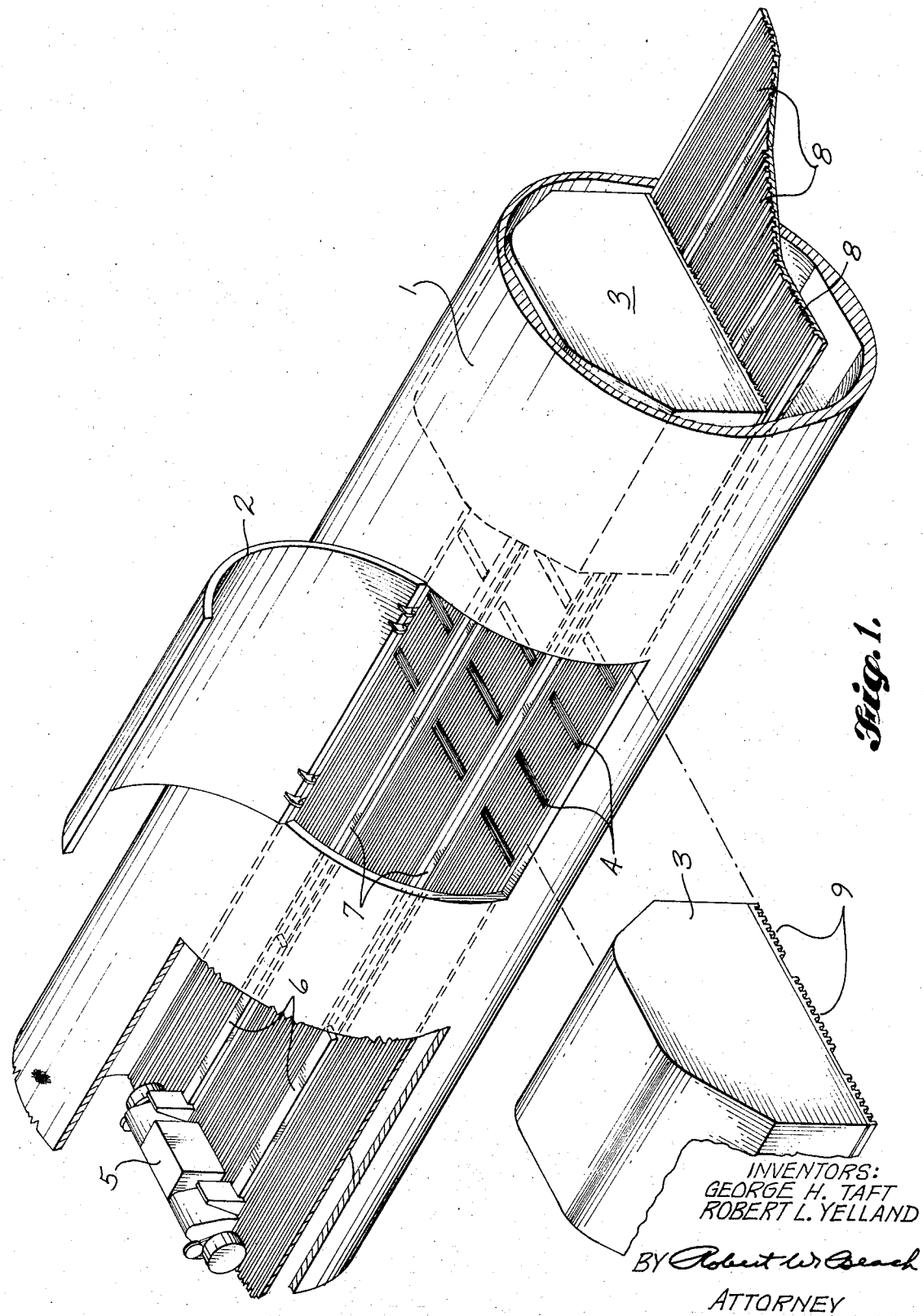
FIG. 1 is a top perspective of a portion of a smaller aircraft fuselage, portions of which being opened and broken away to show relation between the compact airborne carriage, the entry floor transverse mechanisms and the airborne unit load device equipped with serrated lands and grooves that interfit with the aircraft floor structure.

A general arrangement of the preferred embodiments in their application to aircraft are shown in FIG. 1. A unitized cargo load contained within a unit load device 3, is presented at the cargo door 2 opening, then moved through this entry sufficiently for the load to be assumed by the transverse mechanisms 4 operating in the raised or extended setting position as shown in FIGS. 10 and 12. These transverse mechanisms 4 continue to move the load into the aircraft to the exact position necessary to allow the compact carriage 5 to move forward on trackways 7, insert fingers 6 in the self-centering finger channels on container under surface 9, and by actuation of the carriage fingers 6 to a raised or extended position shown in FIGS. 16, 20 and 21, assume full support of the load. Thereupon the loaded carriage moves to final load positioning within the aircraft and lowers container 3 into place, while simultaneously effecting the interfit of the cooperating surface structures shown in FIGS. 2 through 8, and 37. The above detailed loading sequence is reversed for unloading operations.

Aircraft Load Restraint Application

As shown in FIG. 2, the lands 9 are affixed to the under surface of the unit load device 3. FIG. 3 shows the arrangement of serrated teeth 10 which project down at an angle along the sides of lands 9. Parallel supporting floor lands 11, projecting upward from the deck surface best shown in FIG. 37, are placed to cooperate and interfit with complemental lands 9 providing lateral restraint. Once the load is positioned within the aircraft, standard S.A.E.-type pallet restraint latch mechanisms anchored to the floor substructure of all jet freighters are overcast, locking down the unit load device along its sides. The vertical restraint thus provided distributes flight-induced vertical loads over the full under surface of the container 3 through a forced full contact of teeth 10 and 12 as shown in FIG. 8. This eliminates critical or excessive load concentrations at the restraint latch contact points as in current systems.

Transverse Mechanism

A. General Description

The general installation arrangement of the transverse mechanism 4 is as shown in FIG. 1. The mechanisms are installed in a series of cut out sections in the lands 8 on the aircraft floor shown in FIG. 1. A bank of these mechanisms serve laterally to translate the unit load device 3 above the floor lands 11 as shown in FIG. 12. When retracted, the transverse mechanism rests in a low-profile position where all parts thereof are sufficiently retracted below the seated load under surface lands 9 to permit the entryway floor to receive its container as shown in FIGS. 9 and 11. The transverse mechanism is unloaded while being extended or retracted.

B. Raising and Lowering Actuation

Figure 13:
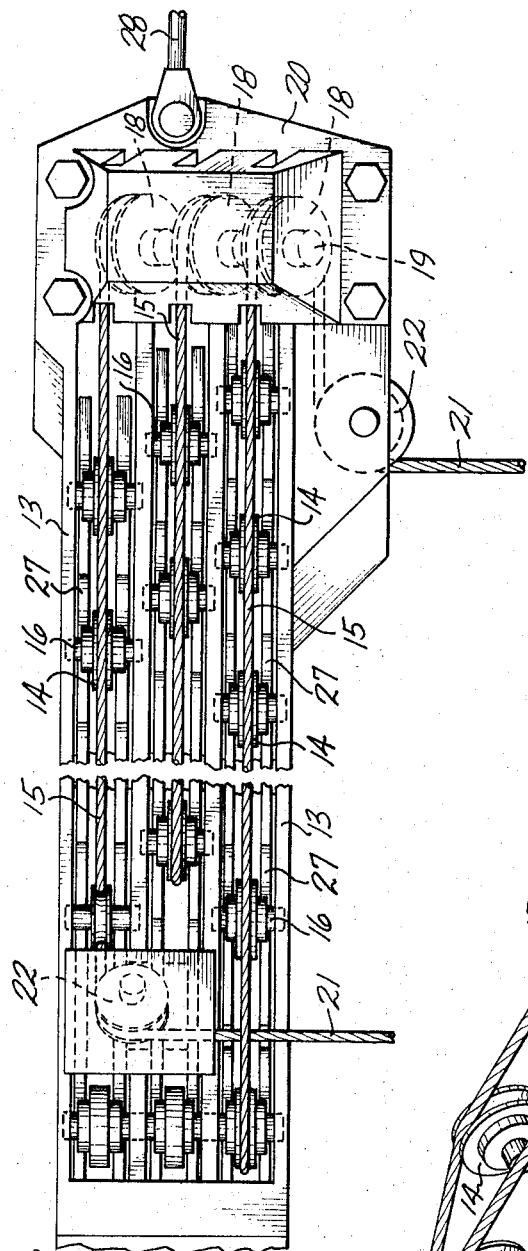
FIG. 13 is a top view of the transverse mechanism showing the frame, the drive cable lay-out, and the load-supporting guide pulleys.

As best shown in FIGS. 9, 10 and 12, support wales 24 project upward from base plate 23. These wales have deep machined notches 25 that receive bearings 17 mounted on axle 16 which in turn is anchored in frame 13 as shown in FIG. 13. The notches 25 are symmetrically spaced in the wales 24 to correspond with spacing of axles 16 in frame 13 as shown in FIGS. 9 and 10. All edges of deep notches 25 are inclined in a common direction at identical angles to provide ramps 27 leading to secondary depressions 26. The elevation of frame 13 relative to base plate 23 may be positively controlled by shifting frame 13 lengthwise, thus forcing bearing 17 up or down ramp 27 as best shown in FIG. 10. Such shifting is accomplished by applying a pull or push to rod 28 attached to end of frame 13 as shown in FIGS. 9, 10 and 13. By pulling rod 28, the bearings 17 roll up ramp 27 from deep notches 25 into smaller secondary depressions 26 as seen in FIG. 10. Conversely, frame 13 can be lowered by pushing rod 28 to move bearings 17 out of depressions 26, over detent humps and back down ramps 27 into deep notches 25.

C. Lateral Cable Drive

As shown in FIGS. 9 through 14, free turning pulleys 14 are mounted between bearings 17 on axle 16 in adjacent bars of frame 13. Pulleys 14 are used to guide cable 15, and are staggered as best shown in FIG. 13. The spacing between centers of axles 16 is less than one container land 9 width so that such container lands will always be supported by several pulleys 14 while load is being moved by the transverse mechanism 4. In this way the weight of the container will always be transmitted directly through the segment of cable 15 cradled in the pulley 14, thence into the pulley support frame 13 itself.

Figure 14:
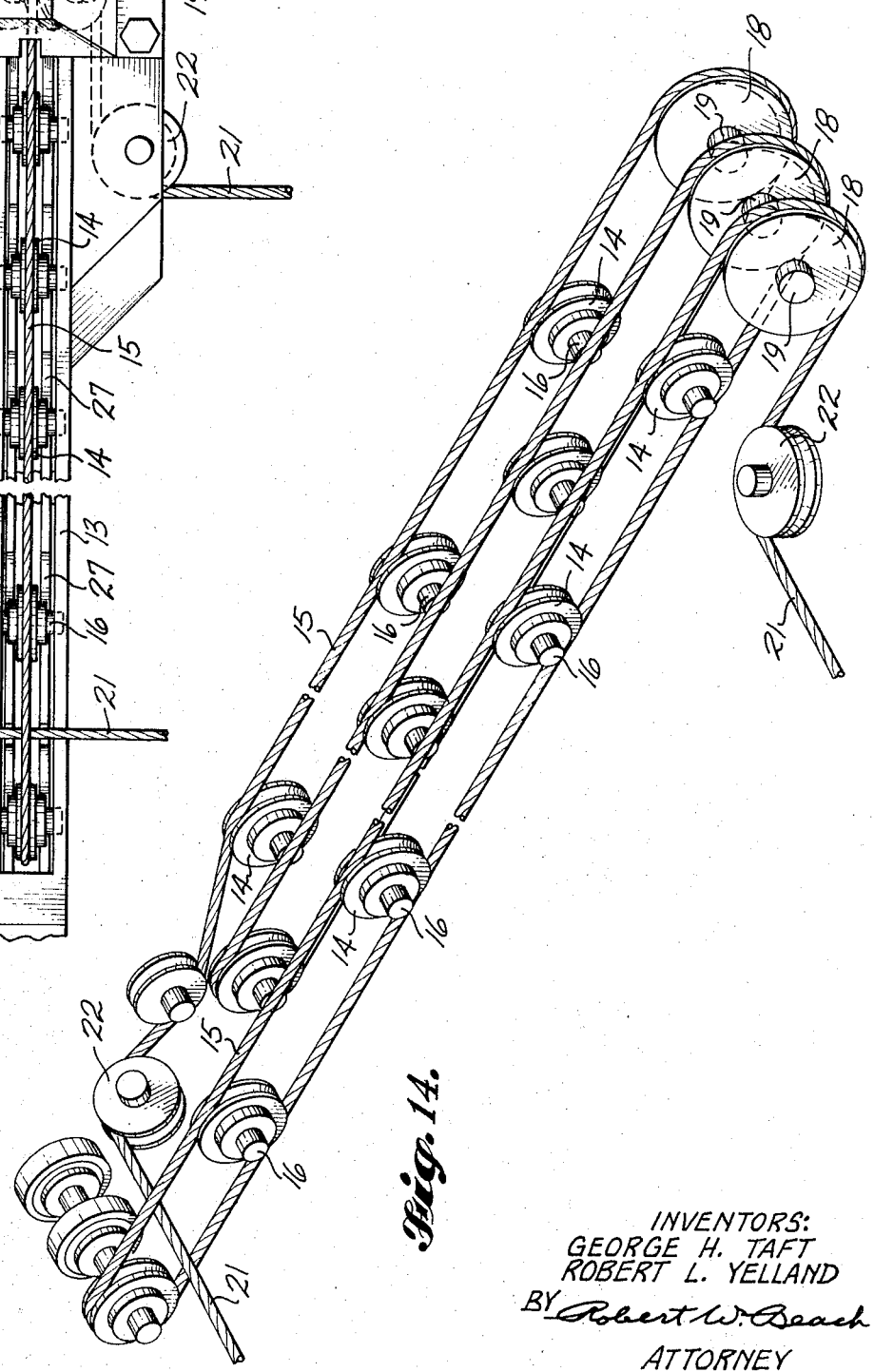
FIG. 14 is an isometric top view of the transverse mechanism drive cable course indicated in FIGS. 9, 10, 11, 12 and 13, enlarged to accentuate the drive cable and pulley arrangement.
Figure 17:
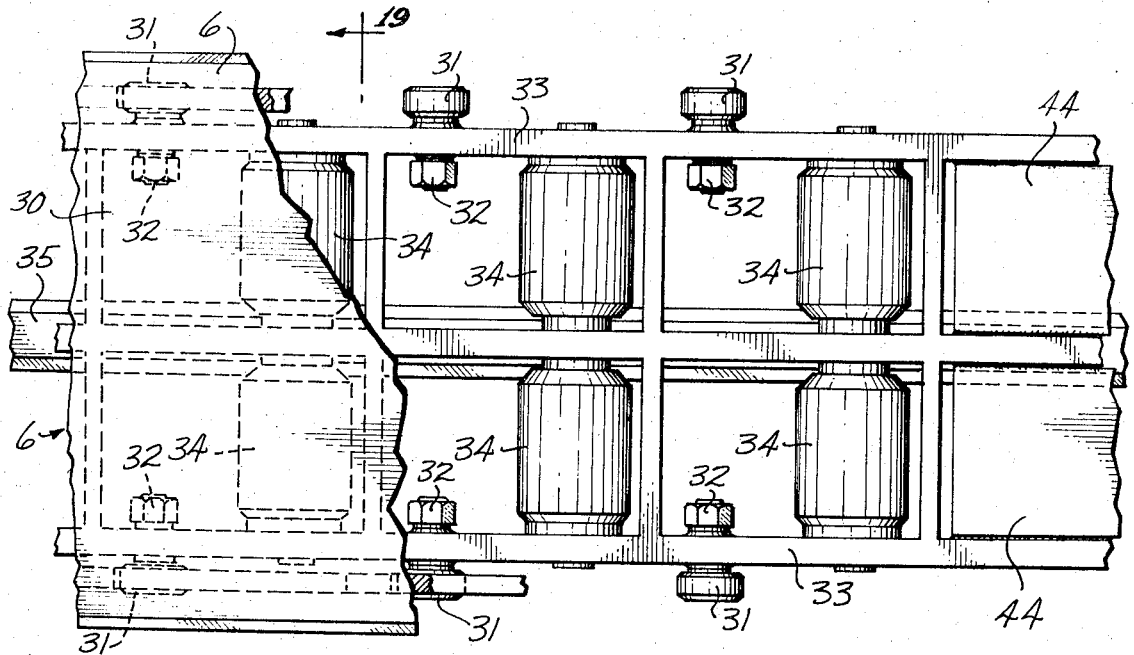
FIG. 17 is a detail plan of a portion of the carriage fingers shown in FIG. 15 and 16 with portion of load-bearing upper plate broken away.

As shown in FIG. 14, the drive cable is so laced among the pulleys in frame 13 that all the stretches of the cable immediately under the load move in the same direction when the cable is pulled in one direction or the other to move the container in or out of the doorway. Cable stretches supported by pulleys 14 pass around tilted pulleys 18 mounted on shafts 19 which are journaled in an end block 20 in frame 13, as best shown in FIG. 14. Cable stretches 21 shown in FIG. 14 extend to the drive mechanism which is not shown. Such cable end stretches 21 extend around respective guide pulleys 22 adjacent to opposite ends of the cable course.

D. Arrangement on Aircraft Floor

An installation of transverse mechanisms 4 should include a sufficient number of units to guarantee proper operation under extreme load/unload conditions. FIG. 1 shows 12 such transverse mechanisms 4 symmetrically arranged in four rows of three mechanisms per row. Each transverse mechanism is floor-mounted within slot 29 provided in the floor land structure as shown in FIGS. 11 and 12. All cable stretch portions 21 of the transverse mechanisms comprising the installation can be gang inter-connected so that drive cable 15 of all units move at the same rate of speed in the same direction. Any number of mechanisms can be arranged at any desired grid spacing depending upon the load capacity required.

Load Positioning Carriage

A. General Description

As shown in FIG. 1, it is necessary to lift the lands 9 of the unit load device above the cargo compartment. The construction of a carriage 5 suitable for this purpose is shown in FIGS. 15 to 23. The carriage is made up of the lifting fingers 6 and the power section 5 containing the electro-mechanical lift and drive mechanisms. As best shown in FIG. 15, all parts are held rigidly in place by frame 42 and also supported by integral battery frame 42a.

B. Carriage Mechanism

Figure 19:
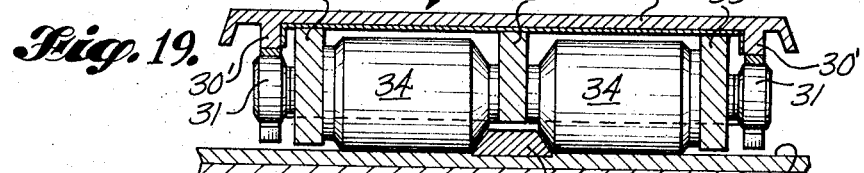
FIG. 19 is a vertical section of the carriage finger shown in FIG. 17 taken along the line 19 — 19.
Figure 20:
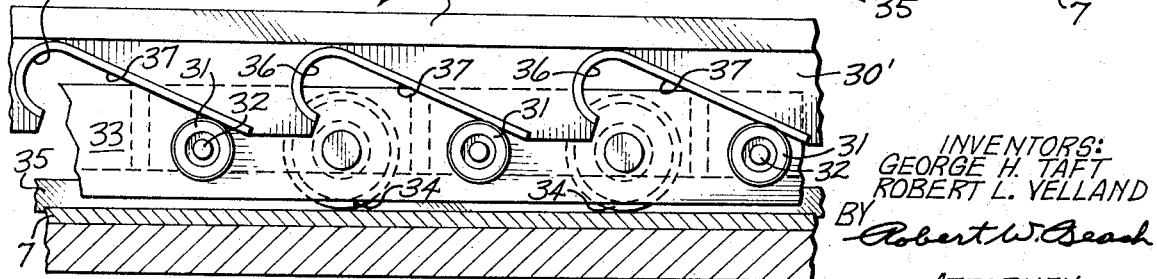
FIG. 20 is a side view similar to FIG. 18 but with the carriage finger assembly in the raised position.

Each carriage finger 6 is made up of two main members: the movable bearing plate 30 on top; and the supporting roller frame 33 on the bottom. As shown in FIGS. 19 and 20, each movable bearing plate 30 is supported by flanges 30' extending along opposite bottom edges. Each of these flanges bears on rollers 31 mounted on axles 32 attached to the roller support frame 33. This roller frame 33 is supported by rollers 34 spaced at intervals along its length to roll on trackway 7. An annular groove in each roller 34 fits over a guide rail 35 in the center of the trackway to guide the finger assembly 6 for horizontal linear movement.

Figure 18:
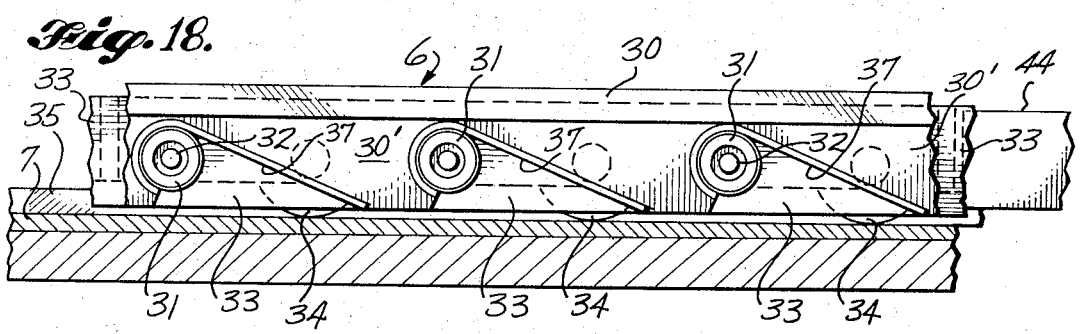
FIG. 18 is a side view of the carriage finger mechanism shown in FIG. 19 illustrating the carriage finger in retracted position.
Figure 21:
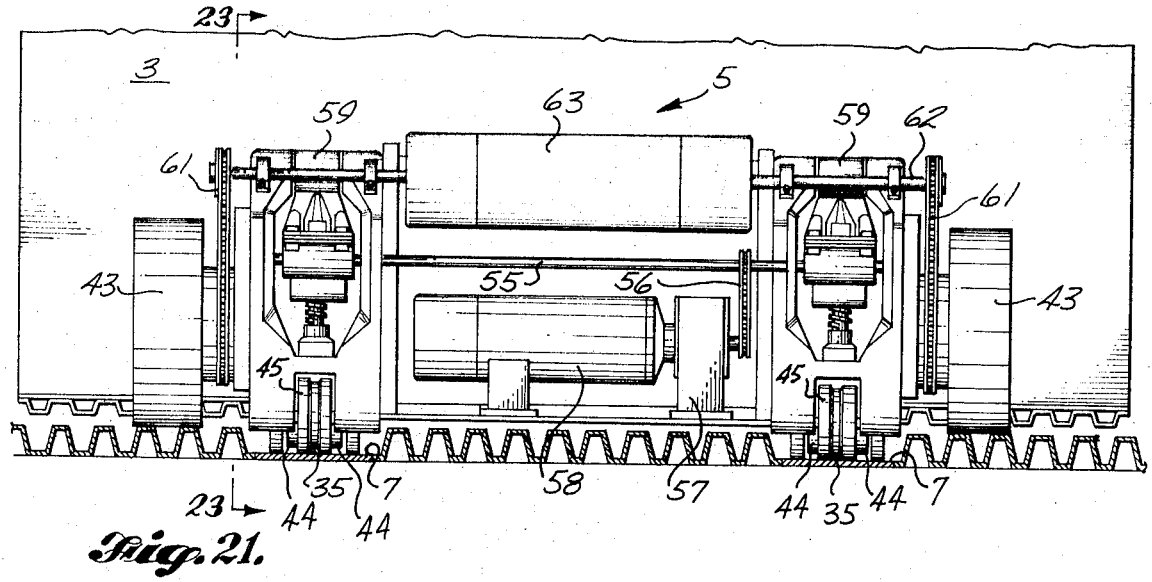
FIG. 21 is an end elevation of the power section of the carriage shown in FIGS. 1, 15 and 16, showing a supported unit load device in the raised position.

Each bearing plate flange 30' has in it deep notches 36 sized to receive a supporting roller 31. The elevation of the bearing plate 30 may be altered relative to trackway 7 by shifting flange 30' lengthwise, forcing ramp 37 in flange 30' to ride up on bearing 31 as best shown in FIG. 20. Such lengthwise shifting is accomplished by securing the supporting roller frame 33 to tongue 44 extending from truck 41 for this purpose. Relative motion is induced through the stroke of a mechanical linkage. When the carriage finger's upper movable bearing plate 30 is in the down or retracted position, deep notches 36 in flange 30' are cradled over the support bearing 31 as shown in FIGS. 18 and 19. When bearing plate 30 is in this relationship to the supporting roller frame 33, the profile of the finger assembly is sufficiently low to roll beneath the container bottom lands 9 when seated into the floor grooves 8 as shown in FIG. 8. When the carriage fingers 6 have been positioned beneath a unit load, the bearing plate 30 and the roller frame 33 are shifted relative to the longitudinal direction so that ramps 37 of deep notches 36 in the flanges 30' will be pushed up over rollers 31 to raise bearing plate 30 relative to supporting roller frame 33, moving it from retracted position shown in FIG. 18 to extended position as shown in FIG. 20. This degree of lift will be sufficient to raise bottom lands 9 of the cargo unit load device 3 above floor lands 11 as shown in FIG. 21. With the carriage braked in place, as shown in FIG. 20, bearing plate 30 lifting stroke is upward at an angle corresponding to the slope of ramp 37. Such slope is sufficient to disengage the mating sloped teeth of container bottom lands 9 and floor lands 11. Conversely, the angular travel of the upper bearing plate 30 is sufficient to engage the mating teeth of the container bottom lands 9 and the floor lands 11 without binding when the load is lowered into its restraint position.

C. Carriage Finger Extension

Carriage fingers 6 of carriage 5 should be of a length to extend completely under various sizes of unit load devices 3. The length of the fingers should be such that they do not extend appreciably beyond that edge of the unit load device opposite the trucks because the end of the fingers might strike another unit load device or other obstruction preventing proper positioning of the moving load. To enable unit load devices of different sizes to be accommodated on carriage fingers 6, it is necessary for such fingers to be extendable in increments, the number of which may be varied to alter the ultimate finger length. Each finger extension might be constructed in 2-foot increments which may be joined with its predecessor in end-to-end relationship.

As described, the carriage finger 6 is composed of two main members: the movable bearing plate 30 on top; and the supporting roller frame 33 on the bottom. Extensions to such fingers are also made of very similarly designed components. FIGS. 15, 24, 25 and 26 show the joint structure connecting two such finger extensions or incremental components. FIGS. 15, 24, 25 and 26 show the joint structure connecting two such finger extensions or incremental components. FIG. 24 best shows adjacent end of adjacent roller frame 33 on the left carrying projecting hooks 104 which are shaped complimentary to coupling rod 101. Also, these hooks 104 are of such a width to be received between collars 102 and spacer block 103 as shown in FIG. 26. Such coupling hooks 104 are engaged with coupling rod 101 by first placing the roller frame extension in the vertical position as shown in FIG. 25. After preliminary engagement, the extension is swung counter clockwise to a horizontal position as shown in FIG. 24.

As described in connection with FIGS. 15 to 20, the finger bearing plate extension 30 is not secured to the supporting roller frame 33, but each bearing plate extension can simply be lifted off the complementary supporting roller frame. As shown in FIG. 26, the adjacent end of the adjacent upper bearing plate 30 on the left has projections 105 and 107. Such projections abut into complementary grooves 106 and 108 for alignment. The shape of such abuting ends should be such as to enable one bearing plate end to transmit a strong axial thrust to the other bearing plate engaged without tending to displace upwardly or downwardly the bearing plate receiving the thrust force under load when a tendency to buckle might be greatest. The bearing plate section is forced tightly against the complementary roller frame section by the weight of the load upon it. When the movable bearing plate 30 and the supporting roller frame are in the relationship shown in FIG. 24, there will only be negligible play between the two finger extension components, hence very slight relative movement of the two corresponding frame units will occur.

D. Carriage Lift Mechanism

The power for raising and lowering the movable bearing plate and thus raising and lowering a unit load device in the manner described; or power for advancing the carriage assembly in an aircraft or warehouse, may be accomplished by the mechanism shown in FIGS. 15, 16, 21, 22 and 23. As best shown in FIG. 15, the finger roller frame 33 is rigidly secured to the power section truck 41 by truck tongue or projection 44. Movable bearing plate 30 is activated relative to roller frame 33 by rod 38 through pivot pin 39. Projection 40 at the power section end of the fingers acts as a stop for the carriage 5 when it is being positioned under the unit load device.

Figure 23:
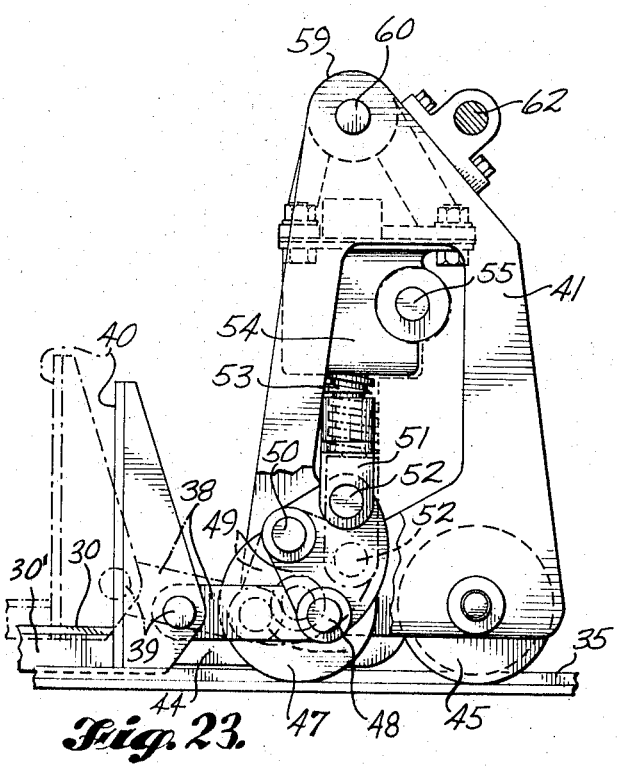
FIG. 23 is a vertical section through the mechanism as indicated by the line 23 — 23 of FIG. 21.
Figure 22:
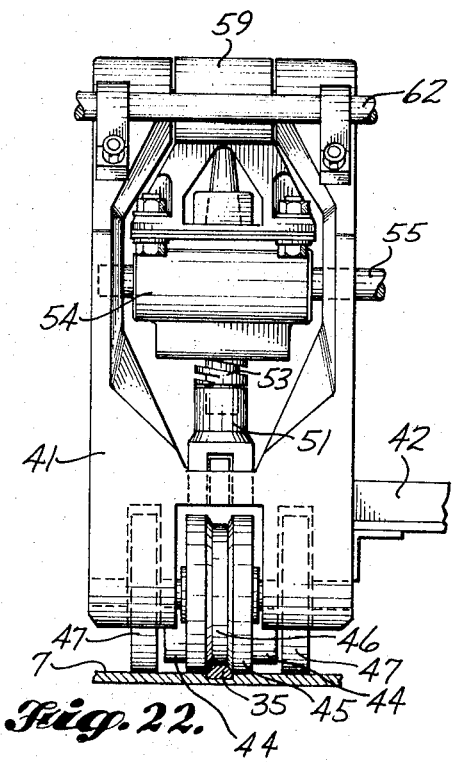
FIG. 22 is an enlarged end elevation of the carriage screw mechanism and supporting guide wheels.

As best shown in FIG. 23, rod 38 is connected by pivot 48 to quadrant plate 49 mounted on truck 41 by means of pivot 50. A yoke 51 is also mounted to quadrant plate 49 by pivot 52. Screw 53, connected to yoke 51 is given lineal movement by the gearing 54 driven by shaft 55. Gearing 54 is mounted to frame 59 which is connected to truck 41 by pivot rod 60 to allow the assembly of parts 59, 54, 53 and 51 to swing for the radius action of pivot 52 about pivot 50. The lineal motion imparted by gearing 54 through yoke 51 is transmitted through quadrant plate 49 to rod 38 and thence to movable bearing plate 30. By such movement sequence, the movable bearing plate 30 will be shifted lengthwise relative to roller frame 33 and truck 41, (roller frame 33 being rigidly secured to truck 41 by tongue 44), for the purpose of raising and lowering the movable bearing plate 30 depending upon the rotational direction of shaft 55. As shown in FIG. 21, shaft 55 is driven by chain 56 connected to reduction gear 57 of drive motor and brake 58. Shaft 55 is common to gearing 54 on both trucks, therefore, quadrants 49, movable bearing plates 39 and connecting parts on both sides of the carriage 5 will be moved synchronously by motor 58. As illustrated in FIGS. 21 and 22, a wheel 45 beneath each truck 41 possesses a center peripheral groove 46 shaped to fit the rail 35 centered in trackway 7 for maintaining the path of movement of the truck in line with that of rollers 34 of the supporting roller frame 33. A pair of stabilizing wheels 47 as shown best in FIGS. 22 and 23, cooperate with wheels 45 to provide three point load support for each truck.

E. Carriage Drive Mechanism

As shown in FIGS. 16 and 21, drive wheels 43 propel the carriage 5 along track 7 in either direction while carrying a heavy unit load device or running empty. For this purpose, the drive wheels are rotated by link chain 61 connecting them to a common drive shaft 62 driven in one direction or the other by reversible motor 63 equipped with a brake. As best shown in FIG. 21, trucks 41 are held rigidly apart by frame 42 which also supports the motors powering the lifting mechanisms and the drive wheels described above.

Ground Handling Attachment Pallet

It will be appreciated that in the application of the present invention to both the aircraft cargo deck and to the under surface of unit load devices to be restrained in such aircraft great consideration has been given to utilizing a construction as compact and light as possible commensurate with accomplishing load restraint objectives. Space and weight considerations are not quite so critical for cargo trucks, trailers or rail cars for aircraft. It is essential that cargo unit load devices be restrained in the aircraft while in flight. These devices must also be capable of being transferred and restrained on trucks and rail cars and also to be placed on and off flat surfaces such as warehouse floors, docks, cemented areas, etc. The ground handling attachment pallet illustrations shown in FIGS. 27 and 30 provides such versatility.

Figure 28:
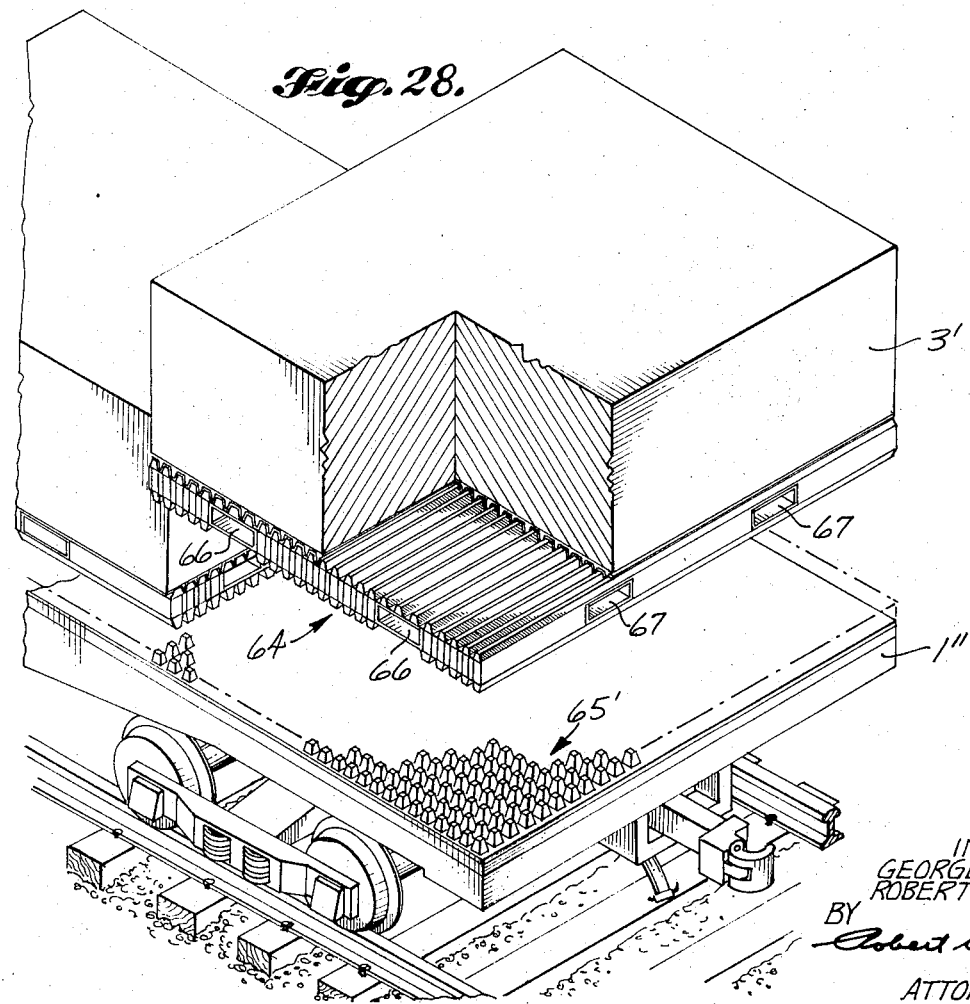
FIG. 28 is a top perspective of unit load devices interfitted with ground handling attachment pallets shown in loading sequence and illustrating the complementary knob-like floor structure of the rail car with a portion of the unit load device broken away to show the interfitment of the present embodiment.

As shown in FIG. 27, the upper surface of the ground handling attachment pallet 64 is engaged with the under side of the unit load device 3'. The attachment pallet so used constitutes an adapter device to enable the container 3' to be anchored to the bed 65 of a flat bed truck or trailer 1', or the floor 65' of a railway car 1'' as shown in FIG. 28, or placed on a flat surface such as a warehouse floor or a dock. The structure of such an attachment is shown as being used in conjunction with a unit load device 3' which differs in shape from the irregularly shaped aircraft unit load device shown in FIG. 1 which will be replaced by more rectangular devices as larger jet aircraft are introduced.

Figure 29:
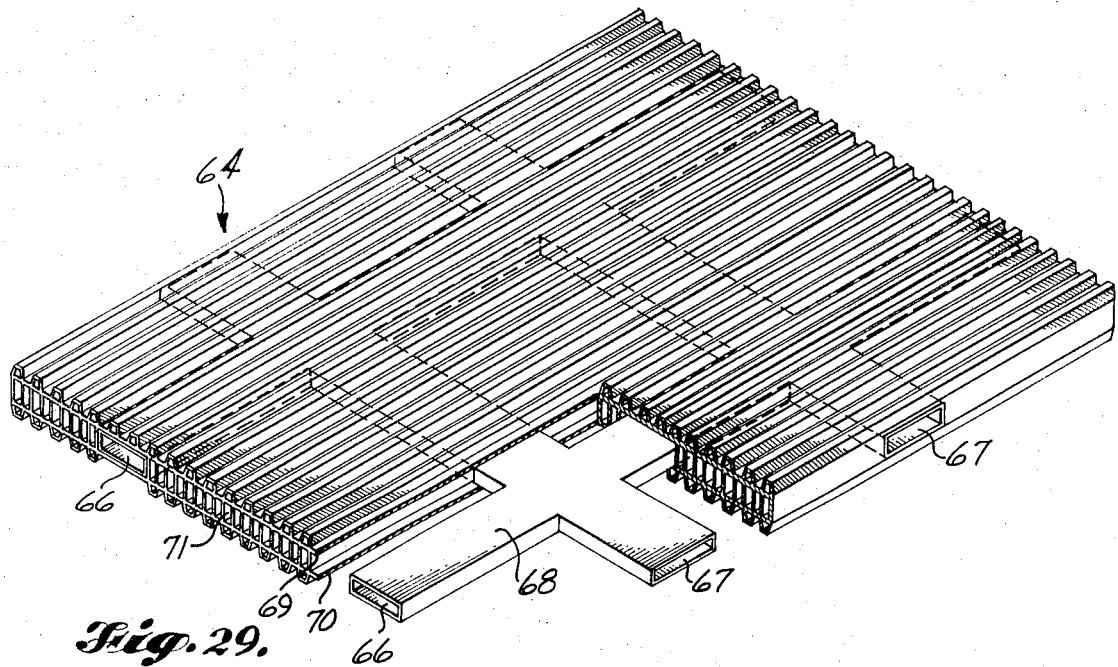
FIG. 29 is a top perspective of the unit load device ground handling attachment pallet with a section broken away to show the upper surface cross section similar to the aircraft floor, the structural web section, the four-way fork lift tine pockets, and the under surface designed to interfit with truck and rail car complemental mating lands or knobs.

For loading a container or unit load device onto the bed of a truck, a trailer or rail car, and for unloading from such vehicles it may be more convenient to use a conventional fork lift truck. As shown in FIG. 29, the ground handling attachment pallet fork tine pockets 66 extend lengthwise to the attachment pallet 64, and fork tine pockets 67 extend transversely of the platform. These pockets are formed by hollow core 68 integral with the attachment pallet. An upper plate 69 above the core and a lower plate 70 below the core are interconnected by parallel strut walls 71 shown best in FIGS. 30, 32 and 34. Projecting downward from the lower plate 70 are lands 72 having their length extending in the same direction as the lengths of strut walls 71. As best shown in FIG. 32, such lands are spaced apart to form intermediate grooves 73. The lands 72 are tapered downward from groove 73.

Also shown in FIG. 32, lands 74 project upwardly from a base plate 75 at intervals to receive between them the lands 72 projecting downward from the attachment pallet plate 70, so that the upward taper of lands 74 is complemental to the downward taper of lands 72 on the under surface of the attachment pallet. Interfitting of the lands 72 and 74 as shown in FIG. 32 will prevent relative movement of the attachment pallet 64 and the base 75 in a direction transversely to the length of the lands 72 and 74. To anchor the attachment pallet against movement of its base longitudinally to the lands, the sides of such lands may be toothed so that teeth on lands 72 may be complementally interfitted to teeth on lands 74 as best shown in FIGS. 30 and 31.

One representative type of teeth for this purpose is shown in FIGS. 30 and 31. As shown in FIG. 30, lands 72 on the bottom of the attachment pallet have teeth 76 of rectangular cross section projecting from their sides with their lengths upright to provide intermediate grooves 77. As shown in FIG. 31, the supporting base lands 74 have rectangular teeth 78 arranged with their lengths upright and spaced apart to provide grooves 79 between them. The widths of teeth 76 are nearly as great as the widths of grooves 79, and the widths of teeth 78 are nearly as great as widths of grooves 77. Consequently, when the lands and grooves are interfitted as shown in FIG. 32, the teeth of each set will be interdigitated with the teeth of the other set in an abutting relationship to prevent relative movement of the attachment pallet and the supporting base lengthwise to the lands. The interfitting cooperative structural surfaces create an interlocking engagement between parts that forms a truss. The allowable load of such a truss tends to increase as the imposed load increases because the interlocking surfaces are pressed more firmly together.

Applications to Surface Vehicles

As shown in FIG. 31, the single monolithic form of lands 74 and base 75 may be attached to the load-carrying bed of a surface vehicle. Such attachement serves to strengthen the load bed. The same monolithic structure of lands 74 and grooves 75 have sufficient depth to resist heavy bending loads and may be used as a single structural bed of a truck or a rail car. Such a truck bed 1' is shown in FIG. 27. The same specific application may be made to a rail car not shown.

The allowable width of a truck/trailer body 1' as shown in FIG. 27 is limited to the maximum width approved for interstate highway freighting—usually 8 feet. In order to utilize the space on such a truck or trailer, most efficiently, one dimension of a container should be approximately the same as the 8 foot allowable width of the truck bed. The width of a rail car 1'', such as shown in FIG. 28 is 10 feet, which is greater than the allowable width of a truck bed. In some instances, it may be desirable to utilize the same cargo unit load device for transportation on an aircraft during one portion of a trip, on a truck during another portion, and on a train for a third. A unit load device 3' having a rectangular bottom 8 feet in width and 10 feet in length can be transported by truck with its width extending transversely of the truck body, and by a rail flat car with its length extending transversely of the car. In FIG. 28 the ground handling attachment pallet 64 is shown as being a rectangular shape to fit a unit load device 3' having a rectangular bottom. The lengths of the under surface lands 72 extend lengthwise of the pallet. Consequently, the base 75 can be mounted on a truck or trailer bed 1' with its lands 74 extending lengthwise of the bed as shown in FIGS. 27 and 38. To enable the pallet to support and restrain a unit load device on a rail car with the lengths of the platform bottom lands extending transversely of the rail car bed 1'' it would be necessary to apply a base 75 to a rail car bed with the length of lands 74 extending transversely of the bed 1'' rather than lengthwise of it (not illustrated).

Alternatively, it may be desirable to provide a base for rail car bed 1'' which can accommodate bottom lands 72 of an attachment pallet extending in either of two perpendicular directions. Such a base adapted to receive a pallet of the type shown in FIGS. 29 and 30 is illustrated in FIG. 33. In this instance, upwardly tapering knobs 74' of square cross section project from a base plate 75'. Each side of each knob is flat and is shown as having teeth 78', corresponding to teeth 78 of the base shown in FIG. 31. Such teeth 78' are spaced apart to provide between them a groove 79' corresponding to the groove 79 of FIG. 31. Moreover, the space between teeth 78' on adjacent knobs 74' corresponds to the spacing between teeth 78 in the series of teeth on lands 74.

It is evident from a comparison of FIGS. 31 and 33 that the profile of knobs 74' is the same as the profile of lands 74 when viewed lengthwise of the lands. Consequently, the bottom lands 72 of the attachment pallet will fit into the grooves between the knobs of the base plate 75' just as they fit between the lands 74 of the base plate 75. Since the rows of knobs 74' have the same profile in perpendicular directions, the pallet bottom lands 72 will fit into either set of grooves formed by knobs 75'. Conversely, the supporting base lands 74 could optionally, extend parallel to the centerline of a rail car or truck/trailer bed as an integral structural part similar to truck deck 1' shown in FIG. 27 and, optionally, the attachment pallet bottom could have downwardly projecting knobs of a design similar to knobs 74' shown in FIG. 33. As described above, the interfitting cooperative structural surfaces not only provide restraint in a horizontal plane, but they also interlock in a manner that forms a truss.

While the attachment pallet has a bottom construction shown in FIG. 30, it will fit the base shown in FIG. 33 in which the knobs 74' have teeth 78' spaced by grooves 79'. The pallet bottom shown in FIG. 34 will fit base 75'' shown in FIG. 36 having knobs 74' with teeth 82' and valleys 83' which are complemental to valleys 81 and teeth 80 on lands 72 in FIG. 34.

Applications to Terminal Handling

Usually an attachment pallet 64 such as shown in FIGS. 27 and 28 carrying container 3' will be moved and positioned by large forklift trucks having its tines inserted in longitudinal pallet pockets 66 or lateral pockets 67. In some instances, however, as shown in FIG. 38, it may be that a carriage assembly 5, 6 running on trackways 7' and 7'' would be utilized to move the palleted container 3' on or off truck flatbed 65. It is evident that this alternate warehouse or terminal dock handling or loading method complements previously detailed applications of this system and in this present case, low-profile turntable 89 can provide interconnecting cross-over to trackways 91a, 91b and 91c servicing various sections of a freight terminal not shown in FIG. 38. The trackway sections 90a, 90b, 90c on the turntable 89 will be somewhat longer than the carriage 5 with its finger assemblies 6 so that with or without a load, the carriage can be completely accommodated on the turntable whichever trackway approach was used.

With an arrangement shown in FIG. 38, a carriage 5, 6 can be moved along a given trackway section 91a crossing onto the turntable 89 and holding, while the turntable rotates to align trackway 90a thus occupied with fixed trackway section 88 so that cargo container 3' can be deposited on truck bed 1' by operating the carriage as described in connection with FIGS. 15 through 23. Unloading trucks equipped with mating unitized cargo restraint structures previously explained in the "Applications to Surface Vehicles" section of this embodiments description can be as readily accomplished, but with many more than a single carriage assembly operating at one time and serving many truck positions on the load/unload dock portion of the terminal as shown.

We claim:

1. An intermodal unitized cargo control system which restrains, handles, positions and structurally supports unitized loads for transportation in aircraft and on surface transport vehicles, comprising:
   a. a unitizing load device bottom anchoring structure consisting of first anchoring means distributed substantially over its under surface and a second anchoring means distributed over the load supporting surface of its transporting vehicle substantially corresponding to the distribution of first anchoring means, the interengagement thereby effected between first and second anchoring means resulting in: truss-like augmentation of load bearing surface, increasing its allowable load; limitation of transverse and lengthwise movement of the load relative to the aircraft or vehicle load support structure; and substantial augmentation of inflight vertical restraint capability of standard industry unitized load latch mechanisms disposed to engage the side edges of said unit load devices;
   b. an intermediate attachment pallet or structure substantially corresponding in dimensions to the length and width of the unitizing load device, having an upper surface essentially complementary to and interengagable with the first anchoring means on under surface of said unit load device, and a lower surface essentially complementary to and interengagable with second anchoring means on transporting vehicle's load support surface; said upper and lower surfaces separated by deep web sections having channeled openings on its four peripheral sides providing handling means for conventional tine-equipped and other ground handling machinery;
   c. a compact retractable low-profile transverse mechanism device capable of moving or shifting heavy unit load devices with smooth or irregular under surfaces across aircraft or vehicle load supporting surfaces and within constricted compartments with minimum clearance between unit load and vehicle structure, and of being retracted sufficiently to permit a superimposing unit load device whose under surface incorporates first anchoring means to be anchored to a surrounding second anchoring means distributed over the aircraft or vehicle's supporting surface;
   d. a powered carriage-device operating system limited to prescribed track or travel ways for moving, handling, loading, unloading and storage of unit load devices: in, on and between aircraft, trucks, rail cars, or other cargo handling and transporting vehicles; in multilevel cargo terminals, depots, storage areas, specialized connective ways, passages, tunnels, viaducts, bridges, turntables and container terminal access areas.

2. In an intermodal cargo control system as claimed in claim 1, including the said unitizing load device bottom anchoring structure, comprising:
   a. first anchoring means including a structure comprising parallel land-like projections complementary to and interengagable with second anchoring means on vehicle support surface including a structure comprising parallel groove-like recesses; both anchoring means disposed in rows lengthwise to line of travel limiting translational movement of first anchoring means transversely of said second anchoring means from intransit lateral inertial forces;
   b. first anchoring means including parallel alternating land-like projections and alternate second anchoring means on vehicle support surface including symmetrical angular upwardly projecting knobs arranged in parallel rows lengthwise and transversely to transporting vehicle line of travel permitting facile engagement with said first anchoring means limiting its translational movement caused by intransit inertial forces laterally of the groove-like projections of said first anchoring means.

3. In an intermodal cargo control system as claimed in claim 2, including the said projections and recesses, comprising:
   a. symmetrical interengagable teeth disposed at an angle to the perpendicular and arranged along the sides of said projections of first anchoring means meshing with complementary symmetrical teeth arranged along the sides of said recesses of second anchoring means disposed at an angle to the perpendicular, the two anchoring means pressed together by the tendency of induced or intransit inertial forces to move the first anchoring means lengthwise of said second anchoring means, and limiting the translational movement lengthwise of aircraft or vehicle line of travel;
   b. symmetrical interengagable teeth arranged along the sides of said recesses of second anchoring means including teeth of rectangular section, requiring, for anchoring first anchoring means to second anchoring means, an intermediate adapter device including a pallet-like structure with its upper surface complementary to and interengagable with said first anchoring means; and with its under surface complementary to and engagable with said teeth of rectangular section along the sides of said second anchoring means on the vehicle supporting surface, limiting translational movement of the supported load relatively and lengthwise to the line of travel of surface transport vehicles such as trucks and rail cars;
   c. symmetrical interengagable teeth arranged along the sides of and essentially aligned with the vertical direction of upwardly projecting knobs of alternate second anchoring means including teeth of rectangular section requiring, for anchoring first anchoring means to second anchoring means, an intermediate adapter device including a pallet-like structure attachable at its upper surface by complementary interengagement with the angular configuration of the first anchoring means; and with its under surface complementary to and engagable with said teeth of rectangular section essentially aligned with the direction of said knobs on alternate second anchoring means on the transport vehicle's supporting surface limiting translational movement of the supported load transversely of and lengthwise to the supporting vehicle line of travel; the pallet-like attachment structure interengagable with second anchoring means in any of four positions at 90° increments.

4. In a compact retractable low-profile transverse mechanism assembly as claimed in claim 1, including the said means for moving or shifting unit load devices, comprising:

1. a strong, raisable and retractable load bearing mechanism assembly consisting substantially of a lower fixed, load supporting surface-mounted structure supporting a movable upper mating frame carrying staggered cable-supporting rollers, capable of being installed individually or in multiples in such an arrangement as to support heavy transiting loads and unitizing load devices;
2. capability for receiving an endless cable, movable in either direction from a remote source which, when operated in gang or unison with other said transverse mechanism assemblies, moves a unitized load device into or out of a constricted area or compartment with positive control of said load movement to provide adequate protection from scraping or impact damage to unit load device and said compartment such as an aircraft cargo hold, truck or rail car body, container cargo terminal storage cubicle or tunnel, etc.

5. In a powered carriage-device operating system limited to prescribed track or travel ways, as claimed in claim 1, including the means for controlled handling of said unit load devices, comprising:

1. a rollered or wheeled device track way, including a low-profile track way capable of being temporarily or permanently mounted on or in the supporting surface of said cargo aircraft or surface transport vehicles and facilities having a center guide rail for guiding said unit load device powered mechanism; an optional means for transmission of electrical power or other electronic impulses for powering, positioning, controlling or guiding said powered mechanism; adaptable for incorporation in or on horizontal or vertical displacement devices or combinations thereof including a low-profile supporting surface turntable, an elevator, a conveyor or other standard and specialized redirectional devices or mechanisms;
2. a thin, strong, expandable load raising mechanism including roller supported track mounted low-profile finger assemblies capable of insertion beneath a unit load device anchored to its aircraft or surface vehicular supporting surface and by applied force capable of raising said load device from its anchored position for purposes of moving, repositioning, or otherwise relocating said unit load device in, on or between said aircraft or surface vehicles and other said cargo terminal facilities, storage areas, access ways, etc;
3. a powered mechanism including a compact electromechanical track mounted carriage for providing power to raise or lower said finger assemblies and for moving a loaded or unloaded unitizing load or other cargo carrying device along said low-profile trackways and said displacement devices by means of direct, remote or programmed electrical or electronic control of said carriage.

* * * * *